March 8, 1955 MASAYASU WATANABE ET AL 2,703,875
DIRECTION INDICATOR UNIT
Filed July 29, 1950 2 Sheets-Sheet 1
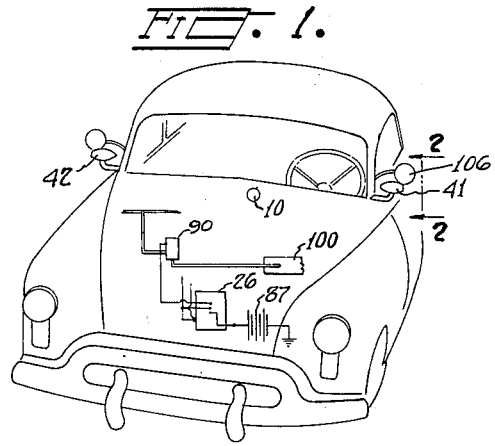
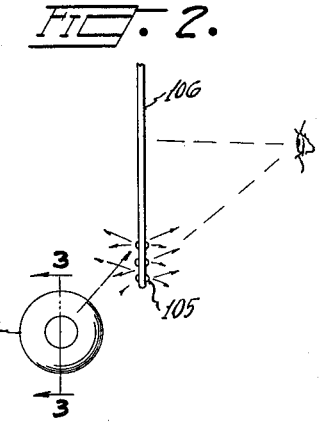
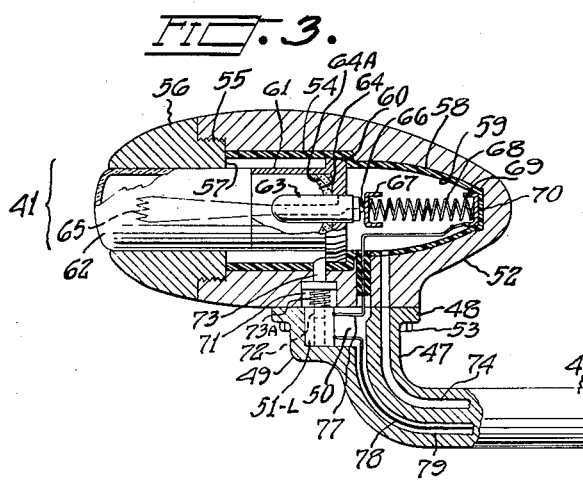
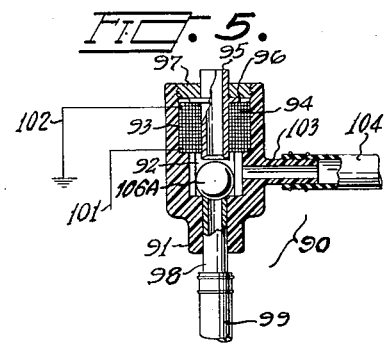
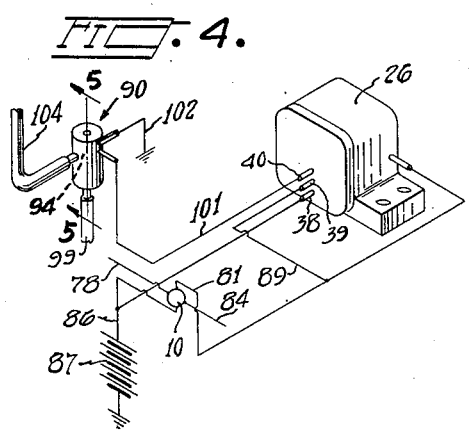
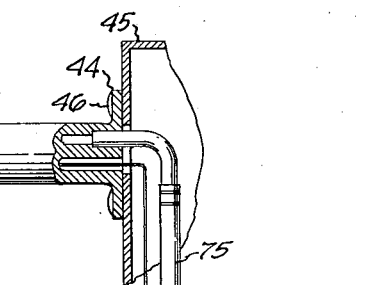
INVENTORS
MASAYASU WATANABE
TERUO WATANABE
BY
ATTORNEY

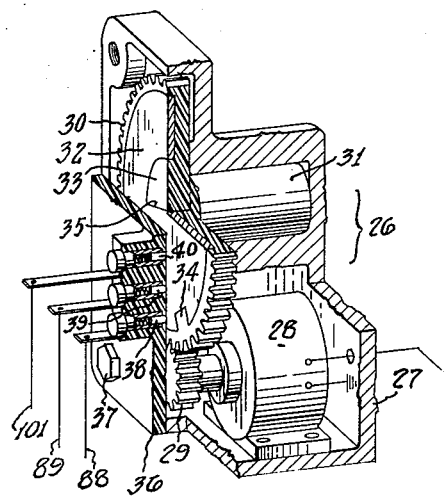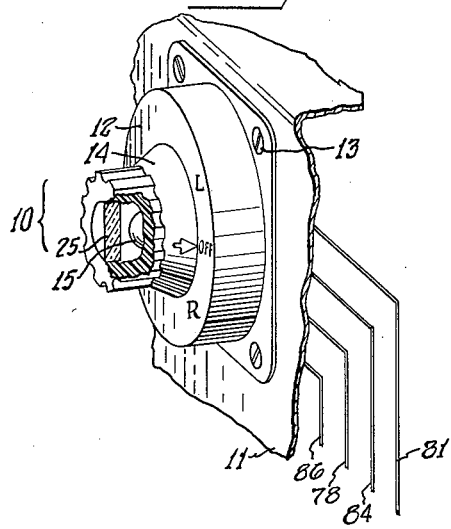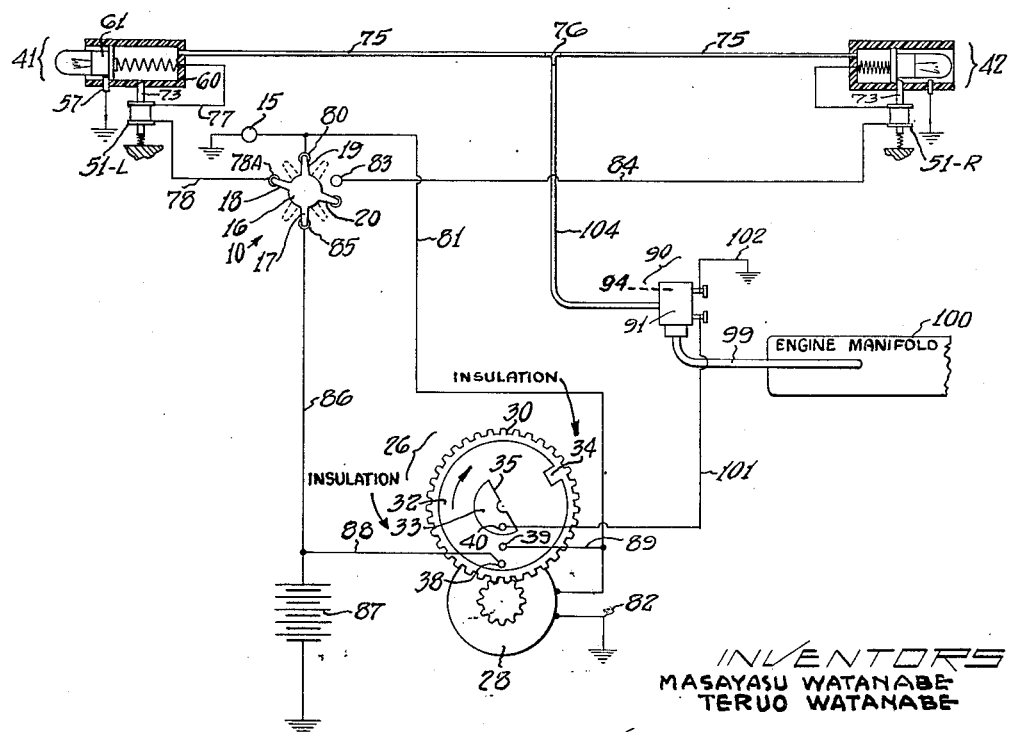

United States Patent Office 2,703,875
Patented Mar. 8, 1955

2,703,875
DIRECTION INDICATOR UNIT

Masayasu Watanabe and Teruo Watanabe, Minato-ku, Tokyo, Japan

Application July 29, 1950, Serial No. 176,684

3 Claims. (Cl. 340—136)

The present invention relates generally to automobiles and particularly to a direction indicator therefor.

Indicators of this nature may be roughly divided into two classes, one having indicating arms arranged on one or both sides of an automobile and capable of swinging about on pivotal axes so as to indicate the direction in which the automobile is about to turn. The other class is one in which an electric flashing device is used to indicate direction. It is the latter class to which this invention relates.

The main object of this invention is to provide an infallible signal indicating the direction of turning a motor vehicle either by day or by night.

The second object is to provide a signal which will be equally visible to occupants of other cars, pedestrians, and even occupants in the car on which the signal is mounted.

The third object is to provide a signal of the class described which will not be apt to be confused with stop lights or tail lights commonly used on motor vehicles.

The fourth object is to provide a disappearing signal arm which will be retracted automatically when not in use.

The fifth object is to construct a signal which will provide a flashing illumination indicating a change of direction.

A further object is to provide a signalling apparatus of the class described wherein an automatic interrupting device for the indicators is provided with two electric circuits, in one of which is inserted a change-over switch, by means of which the automatic interrupting device is put into action and, at the same time in connection with such action, the other circuit is so interrupted automatically as to be open only when each of the indicating parts is restored to its original state while, by the cut-off of the change-over switch, said direction indicating part is always restored to its original state and maintained therein and whereby the two electric circuits are opened and the action of the entire signal ceases automatically.

The seventh object is to provide a low cost direction indicator wherein the direction of turning a vehicle is clearly indicated by automatically reciprocating a direction indicating body and by utilizing the suction of the engine manifold for the operation thereof.

These and other objects will become more apparent from the specification following as illustrated in the accompanying drawings, in which Fig. 1 is a perspective view of a car, indicating thereon the various components of the device shown at a larger scale in Fig. 8.

Fig. 2 is a fragmentary view taken along the line 2—2 in Fig. 1.

Fig. 3 is a section taken along the line 3—3 in Fig. 2.

Fig. 4 is a perspective view of the interrupter and valve.

Fig. 5 is a section taken along the line 5—5 in Fig. 4.

Fig. 6 is a perspective view with parts broken away in section showing the interrupter mechanism.

Fig. 7 is a perspective view of the change-over switch.

Fig. 8 is a diagram of the wiring and the air lines with the switch set for actuating the light to indicate a left-hand turn.

Referring in detail to the drawings, there is shown a group of units including a change-over switch, signal units, an automatic interrupter, and an air valve.

Change-over switch

This switch 10 is a simple two-way switch mounted on the instrument board 11 or in any other convenient position, whose casing 12 is attached to the panel 11 by screws 13 In the dial 14 is disposed a pilot lamp 15 To the dial 14 is attached the rotatable conductor disk 16 from which radiate the contact arms 17, 18, 19 and 20, which can engage the fixed contact posts 78–A, 80, 83 and 85, or assume an intermediate or "off" position, as shown in dotted lines in Fig. 8. The dial 14 has a transparency 25 through which the pilot lamp 15 may be seen.

Automatic interrupter

In Fig. 6 is shown the automatic interrupter or intermittent controller 26 which is comprised of a casing 27 within which is mounted an electric motor 28 whose pinion 29 meshes with a gear 30 of insulating material and rotatable on the shaft 31 which journals in the casing 27.

In the gear 30 is imbedded a metal conductor plate 32 having a semi-circular insulator 33 concentric with its axis of rotation and a rectangular insulator 34 at its outer edge opposite the straight side 35 of the insulator 33. A front 36 of insulating material covers the front of the casing 27 and is secured thereto by the screws 37. In the front 36 are mounted the spring urged contacts 38, 39 and 40, which ride against the conductor plate 32 or on the insulating portions 33 and 34.

Signal unit

In Fig. 3 is shown one of the two signal units 41 and 42, the former of which is on the left side of the car and the latter on the right. Both of the units 41 and 42 are identical except for their positions.

Each unit 41 and 42 includes a bracket 43 whose flange 44 is secured to the car body 45 by means of screws 46. The upturned end 47 of the left-hand arm 43 has a flange 48 around its enlarged portion 49 in which is formed a cavity 50 wherein is disposed an electromagnet 51–L. Mounted on the flange 48 is a body 52, which is secured to the flange 48 by means of the screws 53. The right-hand arm 43 has the same same construction but with the magnet 51–R therein. The bodies 52 are grounded to the car structure.

In the body 52 is a cylindrical bore 54, which terminates at its outer end in the threaded counter-bore 55, into which is screwed the cap 56 of metal whose end 57 forms a stop. In the closed end of the body 52 is formed a recess 58. A liner 59 of insulating material extends from the stop 57 around the interior of the bore 54 and recess 58. The junction of the bore 54 and recess 58 forms an offset 60 in the liner 59. Between the stop 57 and offset 60 is disposed the piston 61 which forms the slide for a lamp 62, which contains a porcelain core 63.

The element 62 has a flanged closed end 64. The element 62 is slidable within the cap 56 between the limits established by the stops 57 and 60. The core 63 is secured to the lamp 62 and piston 61 by a suitable cement 64–A.

One side of the lamp filament 65 is grounded to the piston 61 and the other terminates in the electrode 66. Against the electrode 66 is held a metal cup 67 by means of a spring 68 whose outer end rests in a metal cup 69 against the closed end 70 of the liner 59. Within the body 52 is formed a cavity 71 in which is slidably mounted the armature 72 of the magnet 51. On the armature 72 is mounted a pawl 73 by means of which the piston 61 may be held in its innermost position, as shown in Fig. 3, when the magnet 51 is not energized. The pawl 73 is urged toward the piston 61 by a spring 73–A.

Extending through the bracket 43 and body 52 and liner 59 and communicating with the interior thereof is an air duct 74, which is connected by a tube 75 to a T fitting 76.

One side of each of the magnets 51–L and 51–R is joined by a lead 77 to the cup 69. The other side of the magnet 51–L is joined by a lead 78 through a duct 79 in the arm 43 to contact post 78–A in the hand switch 10 and the other side of magnet 51–R is similarly joined by a lead 84 to contact 83.

The contact post 80 is joined by the lead 81 to one post of the motor 28. The motor 28 has its second post joined by a lead 82 to the ground.

The contact post 83 is joined by a lead 84 to the magnet 51 of the right-hand signal 42.

The contact post 85 is joined by a lead 86 to the battery 87.

The lead 86 is joined by the lead 88 to the contact 38 of the interrupter 26.

The lead 81 is joined by a lead 89 to the contact 39.

In Fig. 2 is shown the use of reflecting transparencies 105 disposed in the lower portion of the rear view mirror 106 to indicate to the driver the operation of the signal and also to increase the visibility of the signal from outside of the car.

*Air valve*

In Fig. 5 is shown in detail the air valve 90, which comprises a valve body 91 having a central cavity 92 at one end of which is a counterbore 93 in which is disposed an electro-magnet 94 through which extends a flanged tube 95 whose flange 96 bears against the magnet 94 and which tube 95 is held in place by the round nut 97. The tube 95 opens to the atmosphere. A tube 98 connects the cavity 92 with the air tube 99 which communicates with the air intake manifold 100 of the motor (not shown). One side of the magnet 94 is joined by a lead 101 to the contact 40, while the other side of the magnet 94 is joined by a lead 102 to the ground. The side outlet 103 of the body 91 is joined by the tubing 104 to the T fitting 76.

A steel ball 106–A is placed within the cavity 92.

*Operation*

The operation of the signal is as follows:

It is assumed that it is desired to signal for a left turn and that the left turn signal 41 is in the position shown in Fig. 3. When the driver turns the dial 14 so that its indicator points to the letter L, the member 16 assumes the position shown in Fig. 8 in which current flows through the lead 78 to the magnet 51–L causing it to withdraw the pawl 73 and permit the lamp 62 to be projected until stopped by the cap end 57, thereby energizing the lamp filament 65 of the unit 41. At the same time, the arm 19 has engaged the contact post 80 causing current to flow to the pilot lamp 15 and to the motor 28 through the lead 81. This causes the gear 30 and its attached conductor plate 32 to revolve continuously and intermittently interrupt the flow of current to the magnet 94. Normally the ball 106–A rests upon the upper end of the tube 98 closing it against the suction in the air tube 99. When the magnet 94 is energized the ball 106 is raised, closing the tube 95 and opening the suction tube 98 which, through the tubes 104 and 75, lowers the pressure within the liner 59, drawing the piston 61 and its attached lamp 62 inwardly, deenergizing the lamp.

As shown in Fig. 8, the magnet 51–L is energized thus holding the latch or pawl 73 down so that the lamp 62 is in an outward position and energized. Magnet 94 is not energized until rotation of gear 30 causes contact of 32 and 40, then through 101 the magnet 94 is energized and suction turned into the line 104 to produce enough vacuum in the line 104 or 75 to return piston 61 to position shown in Fig. 3, deenergizing the lamp. The magnet 51–R, which controls the right-hand signal unit 42, is, of course, inoperative, while the coil 51–L, which controls the left-hand signal 41, is operative.

As long as the switch 10 is left in signalling position as shown in full lines in Figure 8, the gear 30 continues to rotate, alternately energizing and deenergizing the valve magnet 94 and producing an intermittent vacuum condition in the tube 75 causing piston 61 and lamp 62 to be reciprocated in the body 52. At such time the pawl 73 is held retracted by the continuous energization of magnet 51–L through wire 78 and 86 and conductor disc 16. Each time the lamp is projected by spring 68 it is energized by contact of piston 61 with the metal cap 56, and each time the lamp is retracted by vacuum it is deenergized by the separation of parts 61, 56.

When the switch member 16 is turned to its off position, shown in broken lines in Figure 8, at any time when contact 38 is in engagement with plate 32, the motor 28 continues to run for a brief interval by reason of a holding circuit through wire 88, contact 38, metal plate 32, contact 39 and wire 89. However, the circuit through wire 78 to magnet 51–L then having been broken by the switch 10, the pawl 73 is projected by its spring 73A so that the next time contact 40 engages the metal plate 32 on gear 30, the magnet 94 is energized, lifting the ball 106A and creating a vacuum condition in the tube 75 to retract the piston 61 which is then held retracted by the pawl 73. As soon as insulator 34 rides under contact 38, the holding circuit for motor 28 is broken, stopping the rotation of gear 30 immediately. This is the normal rest position of the parts with all circuits deenergized and the lamps retracted.

Thus it can be seen that by means of a relatively simple mechanism it is possible to positively signal right and left-hand turns and the parts can be restored to their original position by merely turning the dial 14. During one-half of a revolution of the gear 30, the lamp 62 is projected and illuminated and during the other half revolution the lamp is retracted and not illuminated.

It is a well-known fact that there have been produced devices wherein the direction of turning is indicated automatically by reciprocal up and down motion of an indicator body instead of a horizontal motion. Such devices, however, are too complicated and the indicator body receives a considerable shock at each operation, thereby causing damage to the device.

In my device the horizontal movement may be made with a lamp in the indicator body remaining ignited instead of intermittently extinguished. Thus, the present invention incorporates commonly known types of direction indicators in one unit and, since the indicator body is adapted to make horizontal reciprocal movements and such movements are without shock or strain, the impact is small and the danger of self-destruction is minimized.

We claim:

1. A direction indicator for automobiles comprised of a horizontally slidable lamp, a signal body forming a guide for said lamp and concealment therefor, a spring within said signal body for urging said lamp outwardly, an electrically operated latch for holding said lamp in a retracted position, a pneumatically operated retractor for said lamp, an electrically operated valve for said pneumatically operated retractor, a power driven switching mechanism for intermittently operating said valve, and a manually operated switch for controlling the operation of said latch and power driven switching mechanism.

2. A direction indicator for automobiles comprised of two signal bodies mounted on opposite sides of an automobile, each of said signal bodies having a lamp horizontally and slidably extendable therefrom in a transverse direction, each of said lamps having a spring for urging it outwardly and having an electrically operated latch for holding it in an innermost position, each lamp also having a pneumatic retractor operable from the intake line of the automobile engine, an electrically operated valve for said pneumatic retractor, a motor driven switch for intermittently operating said valve whereby a continuous reciprocating movement will be imparted to said lamp during the operation of the signal, and a manually operated switch for controlling the operation of said latch and said motor.

3. A signal unit for automobiles comprising a body member adapted for mounting on the vehicle, a lamp mounted in said body member for movement in opposite directions between retracted and projected positions, a spring for moving said lamp in one of said directions, vacuum means for moving said lamp in the opposite direction, a valve for controlling the operation of said vacuum means, an intermittent controller for actuating said valve intermittently to move said lamp back and forth continuously in said opposite directions while the signal is operating, contact means in circuit with said lamp and operable in unison with said movements of the lamp to flash the lamp in synchronism with said back and forth movements, a manipulable member for starting and stopping said intermittent controller, and means for holding said lamp retracted and deenergized after said intermittent controller has been turned off by said manipulable member.

References Cited in the file of this patent

UNITED STATES PATENTS

| | | |
|---|---|---|
| 1,197,862 | Scott | Sept. 12, 1916 |
| 1,216,435 | Gillies et al. | Feb. 20, 1917 |
| 1,251,940 | Ulch | Jan. 1, 1918 |
| 1,629,501 | Haddad | May 24, 1927 |
| 1,890,379 | Haddad | Dec. 6, 1932 |
| 2,082,956 | Riggs | June 8, 1937 |
| 2,099,331 | Crenshaw | Nov. 16, 1937 |
| 2,110,420 | Hill | Mar. 8, 1938 |
| 2,113,192 | Clark | Apr. 5, 1938 |
| 2,521,857 | Kubias | Sept. 12, 1950 |